United States Patent [19]
Shaw et al.

[11] Patent Number: 4,875,556
[45] Date of Patent: Oct. 24, 1989

[54] BRAKE ARRANGEMENT

[75] Inventors: Steven Shaw, Stuttgart; Elmar Weiss, Wurmberg, both of Fed. Rep. of Germany

[73] Assignee: Dr. Ing H.c.F. Porsche Aktiengesellschaft, Weissach, Fed. Rep. of Germany

[21] Appl. No.: 270,689

[22] Filed: Nov. 14, 1988

[30] Foreign Application Priority Data

Nov. 14, 1987 [DE] Fed. Rep. of Germany ....... 3738764

[51] Int. Cl.⁴ .............................................. F16D 65/20
[52] U.S. Cl. ................... 188/72.4; 188/73.37; 188/370; 92/129; 92/255
[58] Field of Search ........... 188/370, 72.4, 72.5, 188/250 E, 73.37, 73.36, 264 G, 217; 92/129, 255, 248, 178, 179, 33, 212, 216, 219, 143, 65, 222

[56] References Cited

U.S. PATENT DOCUMENTS

| | | | |
|---|---|---|---|
| 2,754,936 | 7/1956 | Butler | 188/370 X |
| 3,224,532 | 12/1965 | Simon | 188/370 |
| 3,497,038 | 2/1970 | Schrader et al. | 188/370 |
| 3,625,314 | 12/1971 | Rinker | 188/72.4 |
| 3,703,944 | 11/1972 | Hendrickson . | |
| 3,722,634 | 3/1973 | Ogasawara et al. | 188/73.37 |
| 3,730,302 | 5/1973 | Ogawa et al. | 188/73.37 |
| 3,876,042 | 4/1975 | Borjesson | 188/73.37 |
| 3,890,884 | 6/1975 | Silberschlag | 92/129 X |
| 4,055,238 | 10/1977 | Haraikawa et al. | 188/73.37 |
| 4,513,844 | 4/1985 | Hoffman, Jr. | 188/264 G X |
| 4,572,334 | 2/1986 | Villata | 188/72.4 X |
| 4,581,985 | 4/1986 | Villata | 188/72.4 X |

FOREIGN PATENT DOCUMENTS

| | | | |
|---|---|---|---|
| 0113214 | 11/1984 | European Pat. Off. . | |
| 1194274 | 8/1962 | Fed. Rep. of Germany | 188/72.5 |
| 2412542 | 9/1974 | Fed. Rep. of Germany . | |
| 2834100 | 2/1979 | Fed. Rep. of Germany | 188/72.4 |
| 2854247 | 6/1980 | Fed. Rep. of Germany | 188/264 G |
| 2574507 | 6/1986 | France | 188/264 G |
| 47-21374 | 6/1972 | Japan | 188/72.4 |
| 2150992 | 7/1985 | United Kingdom | 188/72.4 |

Primary Examiner—Douglas C. Butler
Attorney, Agent, or Firm—Barnes & Thornburg

[57] ABSTRACT

A brake arrangement, especially a disk brake for vehicles, includes a brake caliper with brake pads guided on both sides of a brake disk which are operatively connected with hydraulically actuatable actuating pistons. Each actuating piston includes a bore directed toward the brake pad in which is arranged a cylindrically shaped insert number that includes a flange covering the piston end surface and is held with a radial and axial play with respect to the inner circumferential and bottom surface of the bore.

7 Claims, 1 Drawing Sheet

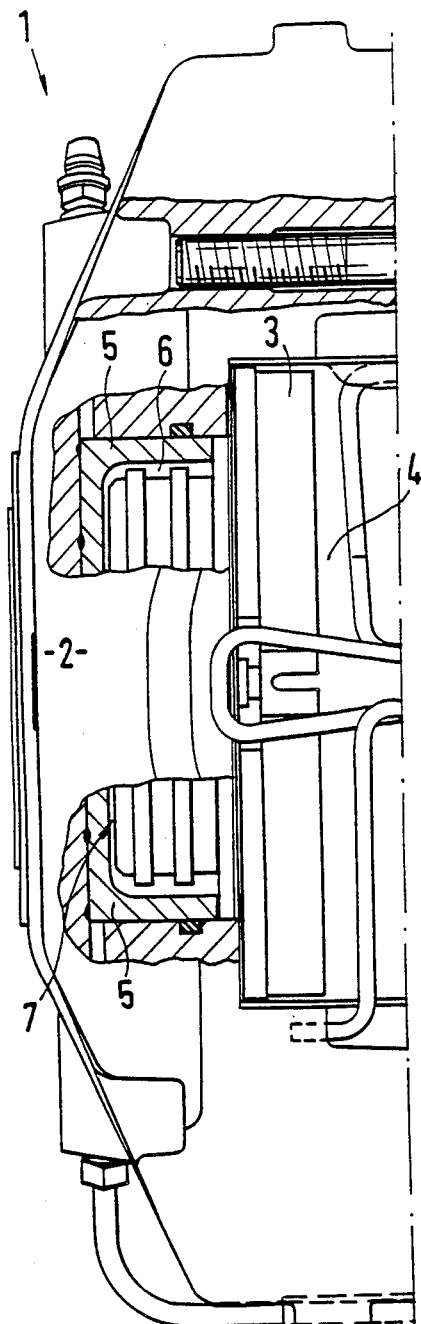
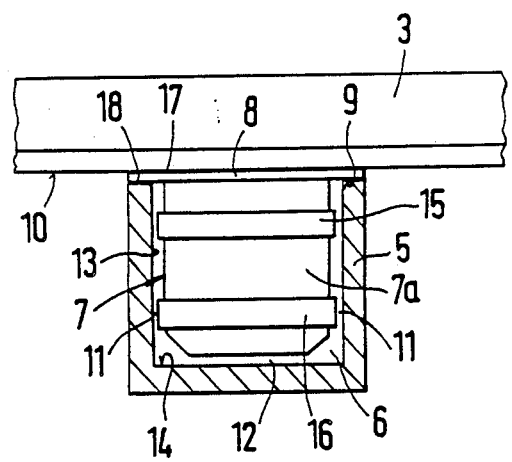
FIG.1
FIG.2

BRAKE ARRANGEMENT

BACKGROUND AND SUMMARY OF THE INVENTION

The present invention relates to a brake arrangement, especially to a disk brake for motor vehicles with brake pads guided in a brake caliper on both sides of a brake disk which are operatively connected with hydraulically actuatable actuating pistons.

Disk brakes can tend to squeaking during the braking operation which is caused essentially by an oscillating movement of the brake caliper as well as of the brake pads. Vibrations may occur at the brake arrangement as a result of these movements which radiate a sound that is noticeable to the human ear as so-called "squeaking."

The present invention is concerned with the task to suppress a brake squeaking during an actuation.

The underlying problems are solved according to the present invention in that each actuating piston includes a bore facing the brake pad, in which a cylindrically shaped insert member is arranged that includes a flange covering the piston end-face and is held with a radial and axial play with respect to the inner circumference and the bottom surface of the bore.

The principal advantages achieved with the present invention reside in that a brake squeaking is precluded by a vibration reduction and by a damping by means of a structurally simple part which can be inserted into a bore of the actuating piston that is already present for the most part. This damping takes place essentially by a frictional connection between the insert member and the piston as well as between the insert member and the brake pad whereby owing to the insert member loosely seated in the bore of the actuating piston, the frequency of the oscillation or vibration energy is converted during the braking operation as a result of a sudden abutment at the inner circumferential surface of the piston from the squeaking frequency into a broad band energy with low oscillation or vibration amplitude. Furthermore, a counter-force is exerted on the brake pads by the displaced masses in the actuating pistons.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIG. 1 is a plan view, partly broken away, on a disk brake with actuating pistons and insert members in accordance with the present invention; and FIG. 2 is a partial cross-sectional view of the actuating piston with the insert member in accordance with the present invention, on an enlarged scale.

DETAILED DESCRIPTION OF THE DRAWINGS

Referring now to the drawing wherein like reference numerals are used throughout the two views to designate like parts, FIG. 1 illustrates a brake arrangement generally designated by reference numeral 1 of a motor vehicle which includes a brake caliper 2 with guided brake pads 3, between which is arranged a brake disk 4. The brake pads 3 are pressed during the braking operation against the brake disk 4 by way of hydraulically actuatable actuating pistons 5.

A bore 6 concentrically directed toward the brake pad 3 is provided in each actuating piston 5, in which a cylindrically shaped insert member 7 is arranged. The insert member 7 includes at its forward end directed toward the brake pad 3 a flange 8 which covers the piston end surface 9 and is disposed directly opposite the brake pad surface 10. The cylindrically shaped section 7a of the insert member 7 is retained in the bore 6 with a radial clearance 11 to the inner circumferential surface 13 and with an axial clearance to the bottom surface 14, whereby it is supported with respect to the piston end surface 9 only by way of the flange 8.

The insert member 7 includes at its cylindrical shaped section 7a raised circumferential areas in the form of concentric rings 15 and 16 which are arranged with a spacing to one another and during an oscillating movement of the brake caliper 2 form abutment points with respect to the actuating piston 5 within the bore 6.

The outer surface 17 of the flange 8 of the insert member 7 is in frictional connection with the surface 10 of the brake pad 3 exactly as also the inner surface 18 of the flange 8 is in frictional connection with the piston surface 9.

Compared to the piston made of a light metal, the insert member 7 consists of a metal of relatively high specific weight such as, for example, of copper, iron or similar metal.

During a braking operation, the brake caliper 2 is excited into oscillating movements, i.e., the caliper 2 is displaced in a rapid change within the possible spatial planes. During these movements of the caliper 2, the insert member 7 consisting of a mass of relatively great weight will move in the bore 6 of the actuating piston 5 within the limits of its radial and axial play and will impact with at least one ring 15 or 16 jerk-like against the piston wall and will change or convert the oscillation or vibration frequency. Additionally, a vibration damping by energy absorption takes place by way of the frictional movement of the flange 8 at the piston 5 and at the surface 10 of the brake pad 3.

While we have shown and described only one embodiment in accordance with the present invention, it is understood that the same is not limited thereto but is susceptible numerous changes and modifications as known to those skilled in the art, and we therefore do not wish to be limited to the details shown and described herein, but intend to cover all such changes and modifications as are encompassed by the scope of the appended claims.

We claim:

1. A brake arrangement for a disk brake of a vehicle comprising:
   brake caliper means;
   brake pad means guided in the brake caliper means on both sides of a brake disk;
   hydraulically actuated actuating piston means operatively connected with the brake pad means and having a bore in a piston end face facing an oppositely disposed brake pad surface of the brake pad means, the bore having both circumferential and bottom surfaces; and
   an insert member having a body portion retained in the bore with both radial and axial play with respect to the inner circumferential and bottom surfaces of the bore and a flange covering the piston end face of the actuating piston means, an inner circumferential surface of the flange being in frictional connection with the piston end face of the actuating piston means and an outer surface of the flange being in frictional connection with the oppositely disposed brake pad surface of the brake pad means, the insert member consisting of a metal having a relatively high specific weight.

2. A brake arrangement according to claim 1, wherein the insert member includes raised circumferential areas which form contact surfaces with respect to the inner circumferential surface of the bore.

3. A brake arrangement according to claim 1, wherein the insert member consists of copper.

4. A brake arrangement according to claim 1, wherein the actuating piston means consists of a light metal and the insert member of a metal of relatively high specific weight.

5. A brake arrangement according to claim 4, wherein the insert member includes raised circumferential areas which form contact surfaces with respect to the inner circumferential surface of the bore.

6. A brake arrangement according to claim 1, wherein a damping takes place by the frictional connection between the insert member and the piston means and between the insert member and the brake pad means.

7. A brake arrangement according to claim 1, wherein the insert member is cylindrically shaped.

* * * * *